US011005707B2

(12) United States Patent
Chatras et al.

(10) Patent No.: US 11,005,707 B2
(45) Date of Patent: May 11, 2021

(54) CLASSIFYING AND ROUTING CONTROL MESSAGES FOR A COMMUNICATIONS INFRASTRUCTURE

(71) Applicant: ORANGE, Paris (FR)

(72) Inventors: Bruno Chatras, Chatillon (FR); Lionel Morand, Chatillon (FR)

(73) Assignee: ORANGE, Paris (FR)

( * ) Notice: Subject to any disclaimer, the term of this patent is extended or adjusted under 35 U.S.C. 154(b) by 0 days.

(21) Appl. No.: 16/472,549

(22) PCT Filed: Dec. 22, 2017

(86) PCT No.: PCT/FR2017/053830
§ 371 (c)(1),
(2) Date: Jun. 21, 2019

(87) PCT Pub. No.: WO2018/115795
PCT Pub. Date: Jun. 28, 2018

(65) Prior Publication Data
US 2019/0327136 A1    Oct. 24, 2019

(30) Foreign Application Priority Data

Dec. 22, 2016 (FR) ...................................... 1663157

(51) Int. Cl.
*H04L 12/24* (2006.01)
*H04L 29/06* (2006.01)
(52) U.S. Cl.
CPC ...... *H04L 41/0803* (2013.01); *H04L 65/1006* (2013.01); *H04L 65/1016* (2013.01); *H04L 65/1073* (2013.01)

(58) Field of Classification Search
CPC ............. H04L 41/0803; H04L 65/1016; H04L 65/1073; H04L 65/1006
See application file for complete search history.

(56) References Cited

U.S. PATENT DOCUMENTS 7,710,950 B2 * 5/2010 Buckley .................. H04L 12/66
370/354
10,250,501 B2 * 4/2019 Ni ........................... H04L 45/74
(Continued)

FOREIGN PATENT DOCUMENTS

EP            2285064 A1    2/2011

OTHER PUBLICATIONS

English translation of the Written Opinion of the International Searching Authority dated Feb. 27, 2018 for corresponding International Application No. PCT/FR2017/053830, filed Dec. 22, 2017.
(Continued)

*Primary Examiner* — Yemane Mesfin
*Assistant Examiner* — Henry Baron
(74) *Attorney, Agent, or Firm* — David D. Brush; Westman, Champlin & Koehler, P.A.

(57) ABSTRACT

A method for managing a rule for classifying a packet of a control message relating to a communications service designed to be used by a terminal of a user. The rule relates to routing of the packet in a communications infrastructure providing the service. The method is implemented in a control entity of the infrastructure. Also provided is a method implemented in a routing device for routing the control message packet in the communications infrastructure.

12 Claims, 5 Drawing Sheets

(56) References Cited

U.S. PATENT DOCUMENTS

Figure 1:
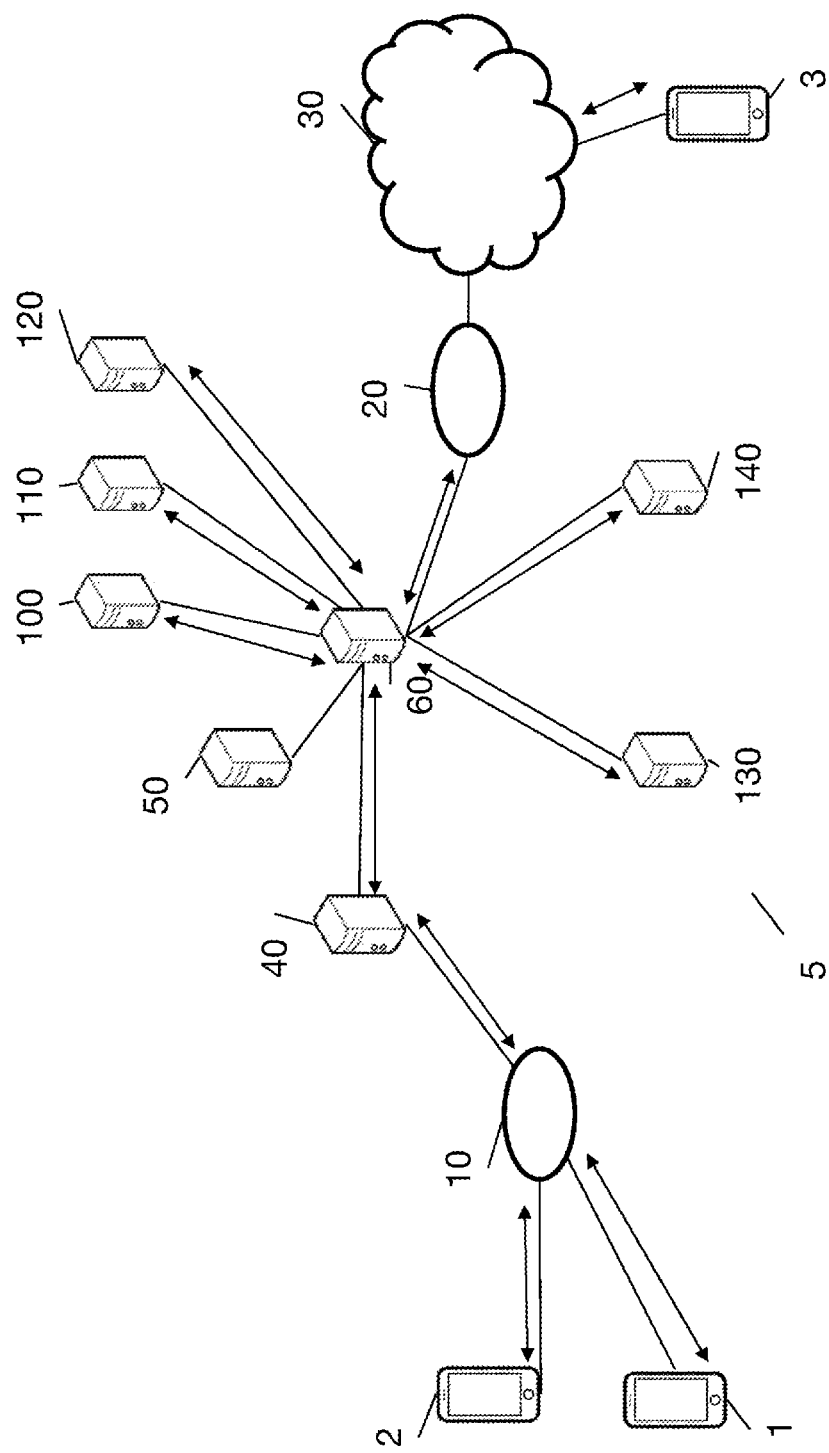

2008/0162705 A1* 7/2008 Cai ..................... H04L 65/1069
709/228
2009/0262920 A1* 10/2009 Henrikson .............. H04L 67/16
379/221.09
2016/0050141 A1* 2/2016 Wu ....................... H04L 45/306
370/389

OTHER PUBLICATIONS

International Search Report dated Feb. 27, 2018 for corresponding International Application No. PCT/FR2017/053830, filed Dec. 22, 2017.
Written Opinion of the International Searching Authority dated Feb. 27, 2018 for corresponding International Application No. PCT/FR2017/053830, filed Dec. 22, 2017.
Quinn et al., "Network Service Header" Service Function Chaining Internet-Draft, draft-ietf-sfc-nsh-10.txt, dated Sep. 20, 2016.
Fajardo et al., "Diameter Base Protocol", Internet Engineering Task Force (IETF), ISSN: 2070-1721, dated Oct. 2012.
Halpern et al., "Service Function Chaining (SFC) Architecture", Internet Engineering Task Force (IETF), ISSN: 2070-1721, dated Oct. 2015.

* cited by examiner

CLASSIFYING AND ROUTING CONTROL MESSAGES FOR A COMMUNICATIONS INFRASTRUCTURE

CROSS-REFERENCE TO RELATED APPLICATIONS

This Application is a Section 371 National Stage Application of International Application No. PCT/FR2017/053830, filed Dec. 22, 2017, which is incorporated by reference in its entirety and published as WO 2018/115795 A1 on Jun. 28, 2018, not in English.

1. FIELD OF THE INVENTION

The invention lies in the field of control network infrastructures and on network function chaining functions.

2. PRIOR ART

The infrastructures of networks providing conversational services over IP (in English Internet Protocol), such as telephony over IP, or more generally of IP services are in general composed of a certain number of control entities, sometimes called call servers in the case of conversational services, tasked with establishing the sessions and of application servers which execute additional services upon the establishment of a base session. The infrastructures based on the SIP protocol (in English Session Initiation Protocol) and in particular the IMS infrastructure (in English IP Multimedia System) defined by the 3GPP (in English 3rd Generation Partnership Project) count among the best known. In these infrastructures, the session establishment messages, composed of packets, are forwarded through a series of servers. Each server performs one or more well-defined tasks and then determines to which server to dispatch the control message until it reaches the recipient's terminal of or a server in charge of this terminal. The forwarding decision is taken at the moment of processing of the message as a function of the characteristics of the message and of configuration data taking account in particular of the topology of the network.

For example, in the case of the IMS infrastructure, during a call emitted by a terminal of a user registered with a server of type S-CSCF (in English Serving Call/Session Control Functions), this server determines on the basis of the content of the call establishment message (SIP INVITE) whether the recipient is registered in the same domain as the emitter user. If the two users are in the same infrastructure, the call establishment message is transmitted to a server called I-CSCF (in English Interrogating-CSCE) charged with determining more precisely on which S-CSCF server the recipient is registered and with making it dispatch the message. Otherwise, the call establishment message is sent either directly to a server of the other domain, or to an entity for interconnection with the infrastructure of the recipient (IBCF, in English Interconnect Border Control Function); this interconnection server then performs one or more processings related to transcoding, to filtering/masking of signaling parameters, to interoperation with other variants of the SIP protocol or other signaling protocols, control of address translation, etc. The interconnection entity selected can vary as a function of the destination infrastructure and/or of the processings to be performed.

Moreover, in the IMS infrastructure, the S-CSCF entities are also in charge of the analysis of the content of the SIP queries received to determine whether it is necessary to involve in their processing one or more application servers. This analysis is done on the basis of filtering criteria, or a combination of these rules, called IFCs (in English Initial Filter Criteria). These criteria are defined in the user's profile, stored in a user data server called HSS (in English Home Subscriber System) and retrieved by the S-CSCF when the user registers with the communications infrastructure. If the content of the SIP query satisfies one of the filtering criteria or several of them (e.g.: type of the message, identity contained in the "From" field of the message, etc.), the S-CSCF entity sends the query to the application server associated with this filter. Several filtering criteria can be defined for one and the same user, each criterion being able to point to a different application server.

The drawbacks of these infrastructures are in particular the following:

Rules must be configured and kept up-to-date on all the S-CSCF entities to allow them to dispatch the call establishment messages to an interconnection entity or otherwise.

It is not possible to make the call establishment message pass through several interconnection entities, each in charge of a processing and to arrange to make it pass only via those that offer a processing that is actually necessary for the communication considered.

Only the S-CSCF entity having access to the filtering criteria contained in the user's profile, it is not possible to insert into the path followed by the control messages application servers before having reached this S-CSCF entity.

It is not possible to make the queries pass directly from one application server to another without again passing through the S-CSCF entity, which created in particular a bottleneck in this entity.

One of the aims of the invention is to remedy these drawbacks of the prior art.

3. DISCLOSURE OF THE INVENTION

The invention aims to improve the situation with the aid of a method for managing a rule for classifying a packet of a control message relating to a communications service intended to be used by a terminal of a user, said rule relating to the routing of said packet in a communications infrastructure providing said service. The method is implemented in a control entity of said infrastructure and characterized in that it comprises, after a step of receiving a signaling message of said terminal, comprising data for identifying said user:

a step of obtaining an information item relating to the communication service, termed service information item, a step of determining said rule for classifying the at least one packet as a function of the service information item obtained, the rule being used for the steering of said packet in the communications infrastructure, a step of emitting an instruction message comprising said determined classification rule destined for said terminal, a step of emitting a configuration message comprising said classification rule destined for at least one steering device.

The management method consists, on receipt of a signaling message, in establishing one or more classification rules on the basis of information items relating to a communication service which are present in the message or else are transmitted by entities of the communications infrastructure. These rules are thereafter exploited by a device of the infrastructure to route the packets of the control messages, that is to say choose a path, represented by a string of entities through which the packets of the control messages are made to flow so as to lead to the establishment of the communication between a terminal and a remote entity. For example, in the case of the establishment of a communication of Voice over IP type in an IMS network between a terminal and a remote entity, the advantage of the management method is to establish a classification rule as soon as a terminal is registered, typically when sending a signaling message corresponding to an SIP Register (in English Session Initiation Protocol Register) registration message. The management method comprises the emission of this rule to the terminal as well as to a device in charge of selecting the path, for example a device of P-CSCF (in English Proxy Call/Session Control Functions) type for the packets relating to the control messages emitted by the terminal and a device of IBCF (in English Interconnect Border Control Function) type for the control messages emitted by the remote entity. The services information item obtained, which may comprise for example filtering conditions or management information items, allow the device implementing the management method to fix classification rules. The services information item received can also comprise a classification rule, as such, and the management method consists in using this classification rule and in sending it to the terminal and to a steering device in such a way that the packets of the control messages are forwarded in accordance with the rule determined. The management method can also be implemented in an SDN (in English Software Defined Networks) infrastructure, in which case the classification rule is advantageously used for the routing of the packets of a control message by the entities supporting SDN technology. The SDN controller can thus configure the various entities placed on the path relating to the classification rule in such a way that these entities have at their disposal the information items making it possible to route the control packets in accordance with the rule. The devices, the terminal and the remote entity may also be virtualized entities.

According to a particular characteristic, the service information item comprises a filtering parameter relating to said identification data received and is obtained from a server comprising data relating to users.

A server comprising the data relating to users, for example an HSS server (in English Home Subscriber Server), can advantageously be used to provide information items relating to the classification of the packets of a control message to the management device. When a user's terminal wishes to connect to the communications infrastructure, it must register beforehand. A server, of HSS type, is usually invoked to provide data to the equipment in charge of registering the terminal. Such a data server manages in particular the users' identities, information items relating to security as well as information items relating to the location of the user. The users' data server can furthermore advantageously provide services information items comprising filtering parameters to the management device in charge of registering the terminal. In particular, the filtering parameters can consist of iFC (in English Initial Filtering Criteria) rules transmitted by the server of the data relating to the users (HSS).

According to a particular characteristic, the service information item comprises a management information item emitted by a management entity of the communications infrastructure.

An entity in charge of the management of the communications infrastructure, for example an administration entity of the infrastructure, can intervene in the classification of the packets of the control messages and therefore in their forwarding within the infrastructure. In particular in the case where the communications infrastructure is used to ensure the forwarding of packets of control messages sent by devices of another communications infrastructure, and destined for an entity belonging to an infrastructure different from that deploying the management device, specific management information items can be taken into account. In the case in point, where the infrastructure ensures the transit of the control messages, a specific path for the packets of such control messages can be selected. Independently of the profile of the users or of other data used to determine a classification rule, the management entity, for example in the case of a network of IMS type, can thus intervene on the classification and the steering of the control packets by providing service information items comprising a management information item, to the device for managing the classification rules.

According to a particular characteristic, the signaling message is a message of registration of said terminal with the communications infrastructure.

The management method can be advantageously implemented during the procedure for registering the terminal to the communications infrastructure. Thus, as soon as the terminal is registered, that is to say as soon as the very first message is emitted by the terminal to establish a communication session, it is possible to determine the classification rules. The control messages emitted by the terminal or destined for the terminal are then routed following paths relating to the classification rules. For example in the case of an IMS infrastructure, the determination of the classification rules is undertaken upon receipt of a message of SIP Register type.

According to a particular characteristic, the instruction message and the configuration message are included in one and the same message.

In one embodiment, a single message can be used to transmit on the one hand the instruction message comprising the classification rule to the user's terminal and on the other hand the configuration information item to a steering device. This lone message transmitted to the user's terminal, comprising a classification rule, may indeed be intercepted by a steering device, which in this case takes into account the information item relating to the classification rule and retransmits the message to the user terminal. This embodiment is in particular relevant in an infrastructure where the steering device is also an access device of the communications infrastructure (for example a device of P-CSCF (in English Proxy Call/Session Control Functions) type and the instruction message is a response message in reply to a registration request. In this case, the P-CSCF must necessarily receive the response to the registration request before retransmitting it to the terminal. It is in this optimal case, to transmit only a single message, comprising the classification rule, to the terminal and to the steering device which can then both utilize the rule received. For example, in the case of an IMS infrastructure, the sending of a single message of SIP Register 200 OK type comprising the forwarding rule will be able to suffice to configure the steering device, which could be a P-CSCF, and to inform the terminal of the registration response comprising the classification rule.

According to a particular characteristic, the service information item is based on the content of at least one field of the packet of the control message.

On the basis of an information item present in a control packet, it is possible to determine a classification rule. In particular, the information item relating to the identity of the terminal and/or of the remote entity can be used to determine a classification rule. According to the number of classification rules and the degree of precision of the classification rules, it is possible to consider several fields to determine a classification rule. For example, if dealing with control messages of SIP type (in English Session Initiation Protocol), the information items of the fields P-Asserted identity and/or Remote-party-Identity will be able to be used to determine a classification rule. No limitations exist as regards the number of fields of a packet of a control message that are able to be used to determine a classification rule.

According to a particular characteristic, the control entity is implemented in a management entity relating to a user.

A management entity for managing the sessions of the users of a communication infrastructure may for example advantageously implement the method for managing a classification rule. A classification rule being determined upon receipt of a signaling message, for example to register a user's terminal, it may be optimal to use a sessions management entity, in charge in particular of the registration functions (in English Registrar). The sessions management entity communicating with a database of the users (HSS) will furthermore be able to use interfaces with this database in the case in particular where the service information item must be obtained from this base. The use of the sessions management entity as entity carrying out an embodiment of the invention thus makes it possible to use the existing interfaces with the other devices of the communications infrastructure for the requirements relating to the determination of a classification rule. In a particular embodiment, the sessions management entity is a device of type S-CSCF (in English Serving Call State Control Function). In a more generic manner, the management entity relating to a user maybe a user session management entity or else a user registration management entity.

According to a second aspect, the invention also relates to a method for steering a packet of a control message relating to a communications service intended to be used by a terminal of a user, the steering being carried out in a communications infrastructure providing said service, the method comprising:

a step of receiving the packet of the control message, a step of receiving a configuration message comprising a classification rule emitted by a control entity, a step of determining a routing parameter as a function of the rule contained in the configuration message received, the rule being used for the steering of said packet in the communications infrastructure, a step of inserting the routing parameter determined into a field of said packet, a step of selecting an entity to which to emit the packet as a function of the routing parameter, a step of emitting said packet destined for the selected entity.

The steering method is implemented so that the packets of the control messages are forwarded within the communication infrastructure in accordance with the classification rule determined by a control entity such as for example the device able to register the terminal.

The steering method consists, upon receipt of a packet of a control message, in integrating a datum thereinto making it possible to match up with the classification rule, a corresponding datum allowing the identification of a path through the communications infrastructure.

More precisely, the steering method consists in marking a packet of a control message as a function of the classification rule, that is to say in modifying the packet by adding an information item making it possible to forward the packets of the control message in accordance with the classification rule. This marking thereafter enables on the one hand the packet to be able to be transmitted to an entity, which may be a call server or an application server of the infrastructure, and on the other hand this entity to choose an entity to which to transmit the packet. The marking can correspond to the insertion of a routing parameter into the packet on the basis of which the various entities of the infrastructure are able to forward the packets of the control messages. According to the prior art, the forwarding of control messages relies on the implementation of an entity to which the control messages are transmitted systematically, this entity retransmitting the message to another entity which will return the packet to it once it has ensured the processing under its charge. The steering method, such as described in this claim, consists in inserting a routing parameter into the packet which allows the entities of the infrastructure to route the packet of a control message gradually without the packet having necessarily to travel through one and the same entity several times.

The classification rule may for example be used to define for example a header added to the packet of the control message received. On the basis of this header, the device implementing the steering method is able to select an entity to which to send the packet, this reception entity being able itself to choose an entity to which to send the packet on the basis of the added header. In another embodiment, the parameter allowing the routing of the packet can be inserted into another field of the packet, different from the header. The device implementing the steering method can be specific to the outgoing packets, emitted by the user terminal, in which case another device implementing the steering method must ensure the steering of the incoming packets, emitted by a remote entity. As a function of certain infrastructure constraints, a single entity may be in charge of steering the incoming and outgoing packets. But in the majority of cases, at least two entities are deployed, the steering method being able also to be implemented in a classification rules management entity. Furthermore, it should be pointed out that the classification rule determined for the incoming packets may differ from the rule determined for the outgoing packets. The paths of the packets of the control messages themselves may differ depending on whether they relate to the packets of the incoming control messages or the packets of the outgoing control messages.

According to a particular characteristic, the routing parameter is inserted into a NSH field (in English Network Service Header) of the header of the packet.

The techniques related to the chaining of services, such as specified in the SFC (in English Services Function Chaining) working group of the IETF (in English Internet Engineering Task Force) can advantageously be used for the insertion of the routing parameter determined as a function of the classification rule received. In particular, the insertion of the parameter into a header NSH (in English Network Service header) specified in the document draft-ietf-sfc-nsh-10.txt enables the routers in charge of routing the packets of the control messages to be able to forward the packets to the recipients by using the inserted datum. This embodiment in particular makes it possible to be able to use a common transport infrastructure for the signaling packets and the so-called useful packets, comprising the useful data generated by the services used by the users. The routing parameter present in the NSH field of the packet makes it possible to be able to adapt the path of the control packets in accordance with the determination of a classification rule operated by the management device.

The various aspects of the management method and of the steering method which have just been described can be implemented independently of one another or in combination with one another.

According to a third aspect, the invention relates to a device for managing a rule for classifying a packet of a control message relating to a communications service intended to be used by a terminal of a user, said rule relating to the routing of said packet in a communications infrastructure providing said service, characterized in that it comprises, in addition to a receiver designed to receive a signaling message in respect of said terminal, comprising data for identifying said user, the following modules:

an obtaining module configured to obtain an information item relating to the communication service, termed service information item, a determination module configured to determine said rule for classifying said packet as a function of the service information item obtained, an emitter configured to emit an instruction message comprising said determined classification rule destined for said terminal, a configuration message comprising said classification rule destined for at least one steering device.

This device, able to implement in all its embodiments the method which has just been described for managing a classification rule, is intended to be implemented in a control entity.

According to a fourth aspect, the invention also relates to a device for steering a packet of a control message relating to a communications service intended to be used by a terminal of a user, implemented in a communications infrastructure providing said service, comprising the following modules:

a receiver designed to receive the packet of the control message, a configuration message comprising a classification rule, a determination module configured to determine a routing parameter as a function of the rule contained in the configuration message received, an insertion module configured to insert the routing parameter determined into a field of said packet, a selection module configured to select an entity to which to emit said packet as a function of the routing parameter inserted, an emitter configured to emit said packet destined for the selected entity.

This device is able to implement in all its embodiments the steering method which has just been described.

According to a particular characteristic, the steering device is implemented in an access entity of the communications infrastructure.

The object of the steering of the packets of a control message is to arrange to select a path specific to these packets as a function of the classification rule received from a management device and of the routing parameter inserted into the packet of the control message. For the incoming packets and the outgoing packets, it is therefore advantageous that the steering device also be an access entity of the communications infrastructure. The packets of the outgoing control messages, emitted by the terminal, are usually forwarded to a default access device. This access device, on the basis of the classification rule received in the configuration message, is able to forward the packets to the following entity in accordance with the routing parameter determined and of its routing configuration. In the same manner, for the so-called incoming packets, a device for interconnecting the communication infrastructure with other infrastructures, which are for example administered by other administration entities, can advantageously comprise the modules of a steering device. Thus, in the communications infrastructure, the devices for access to the infrastructure, if they are also in charge of steering the packets, make it possible for all the entities in charge of forwarding the packets, to exploit the routing parameter inserted by the access devices for the forwarding of the packets. It should be noted that the modules of the steering device can be implemented in a single access device, for the packets of the incoming and outgoing messages, as a function of the infrastructure of the communication infrastructure and of the deployment options adopted by a manager ensuring the administration of the communications infrastructure. In the example of a network of IMS type, the modules of a steering device can be implemented in an equipment of type P-CSCF (in English Proxy Call State Control Function), an equipment of type IBCF (in English Internet Border Control Function) or indeed in an equipment of type S-CSCF (in English Serving Call State Control Function). The access entity may for example be a router or a gateway.

Thus in the case where an S-CSCF integrates the modules of a device for managing a classification rule, it can also integrate the modules of a steering device. In this embodiment, a single entity is used for the management of the classification rule and the steering of classification control message packets and the steering of control message packets.

According to a fifth aspect, the invention also relates to a system for managing a classification rule comprising:
at least one device for managing a classification rule,
at least one steering device.

According to a sixth aspect, the invention relates to a computer program, characterized in that it comprises instructions for the implementation of the steps of the method for managing a classification rule, when this method is executed by a processor and a recording medium readable by a management device on which the computer program is recorded.

The invention also relates to a computer program, characterized in that it comprises instructions for the implementation of the steps of the steering method, when this method is executed by a processor and a recording medium readable by a management device on which the computer program is recorded.

These programs can use any programming language, and be in the form of source code, object code, or of code intermediate between source code and object code, such as in a partially compiled form, or in any other desirable form.

The invention also envisages an information medium readable by a computer, and comprising instructions of the computer programs such as mentioned hereinabove.

The information medium can be any entity or device capable of storing the program. For example, the medium can comprise a storage means, such as a ROM, for example a CD ROM or a microelectronic circuit ROM, or else a magnetic recording means, for example a diskette (floppy disk) or a hard disk.

Moreover, the information medium can be a transmissible medium such as an electrical or optical signal, which can be conveyed via an electrical or optical cable, by radio or by other means. The programs according to the invention can be in particular downloaded over a network of Internet type.

Alternatively, the information medium can be an integrated circuit in which the respective programs are incorporated, the circuit being adapted to execute or to be used in the execution of the methods in question.

4. PRESENTATION OF THE FIGURES

Figure 2:
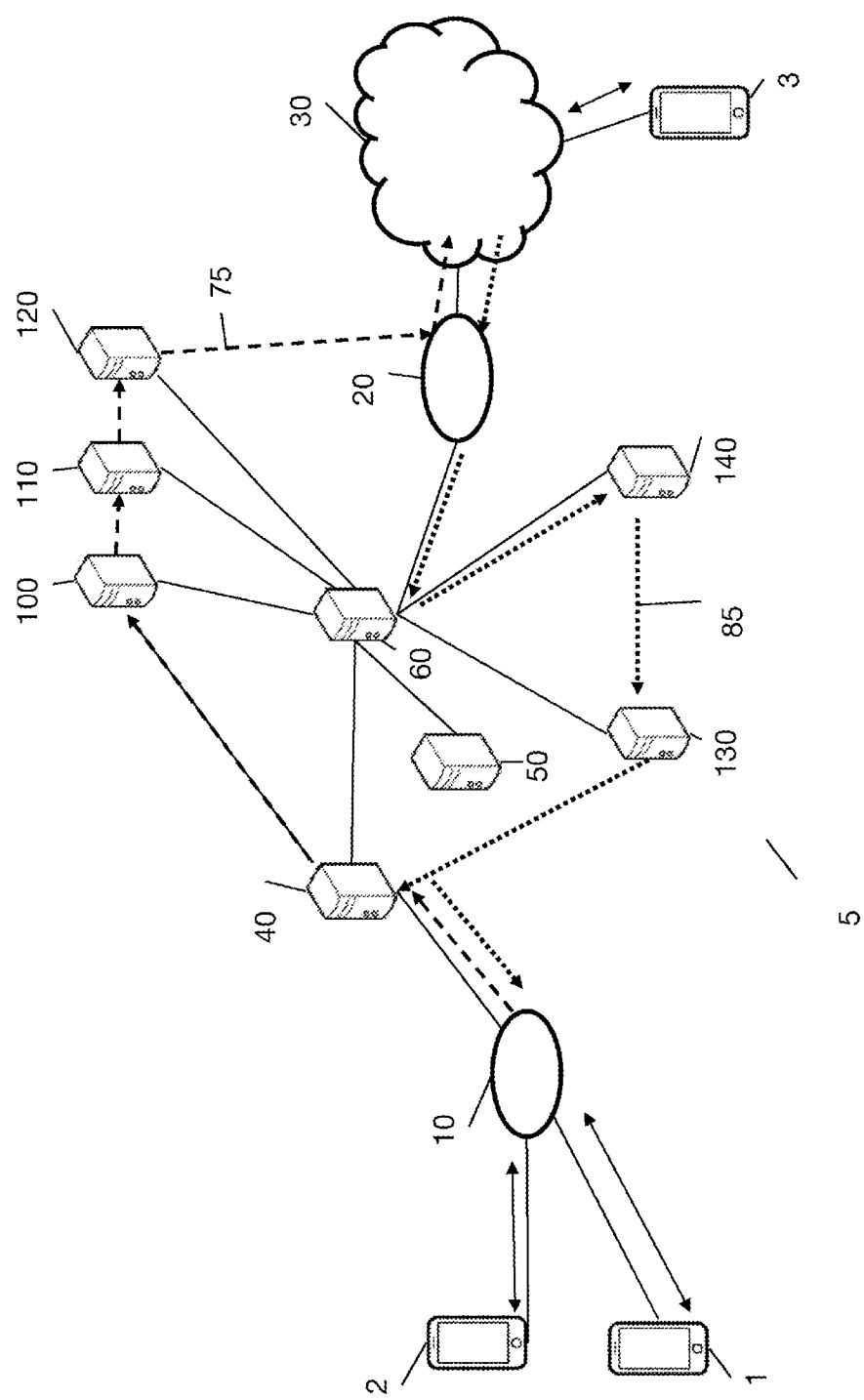
Figure 3:
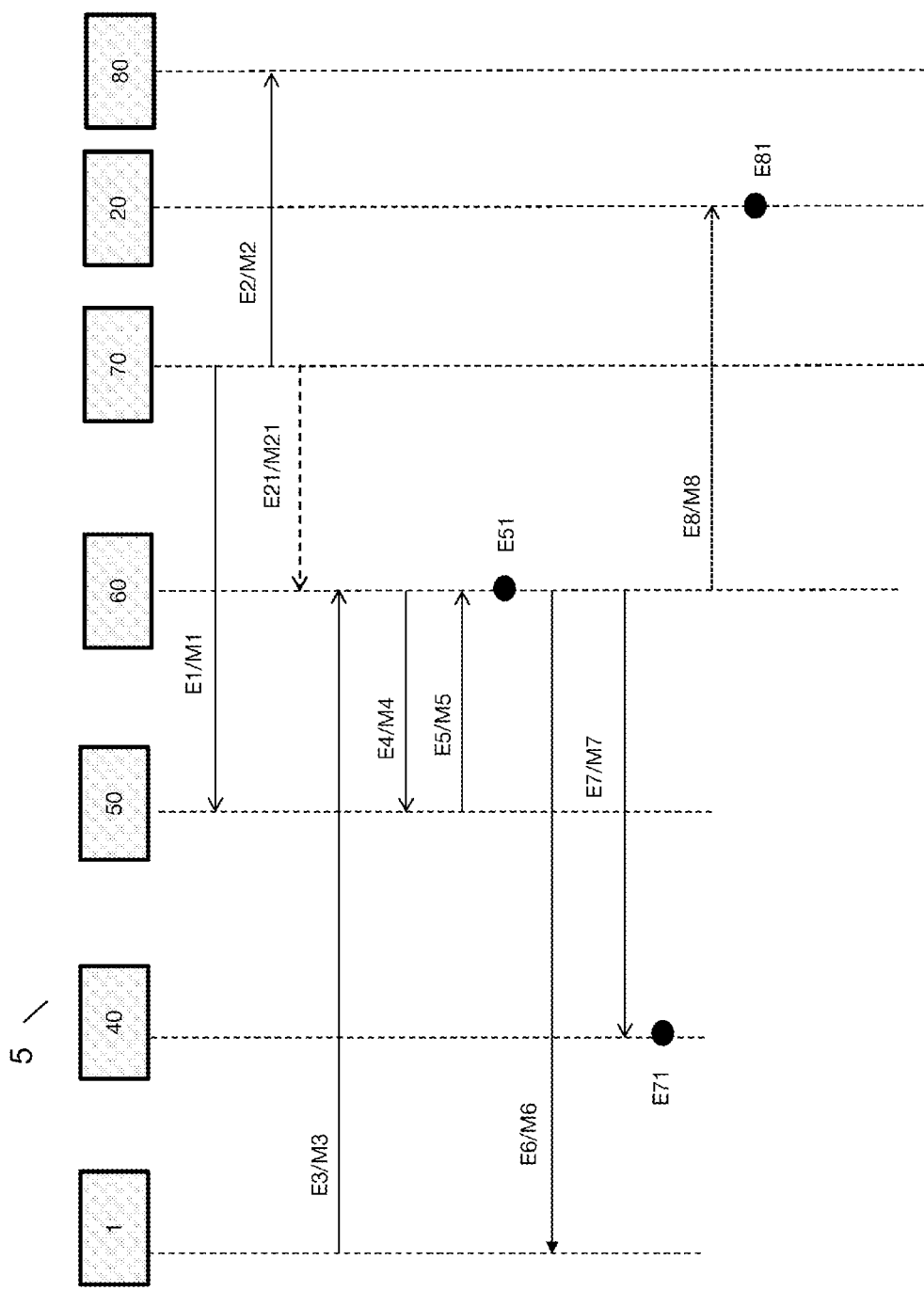
Figure 4:
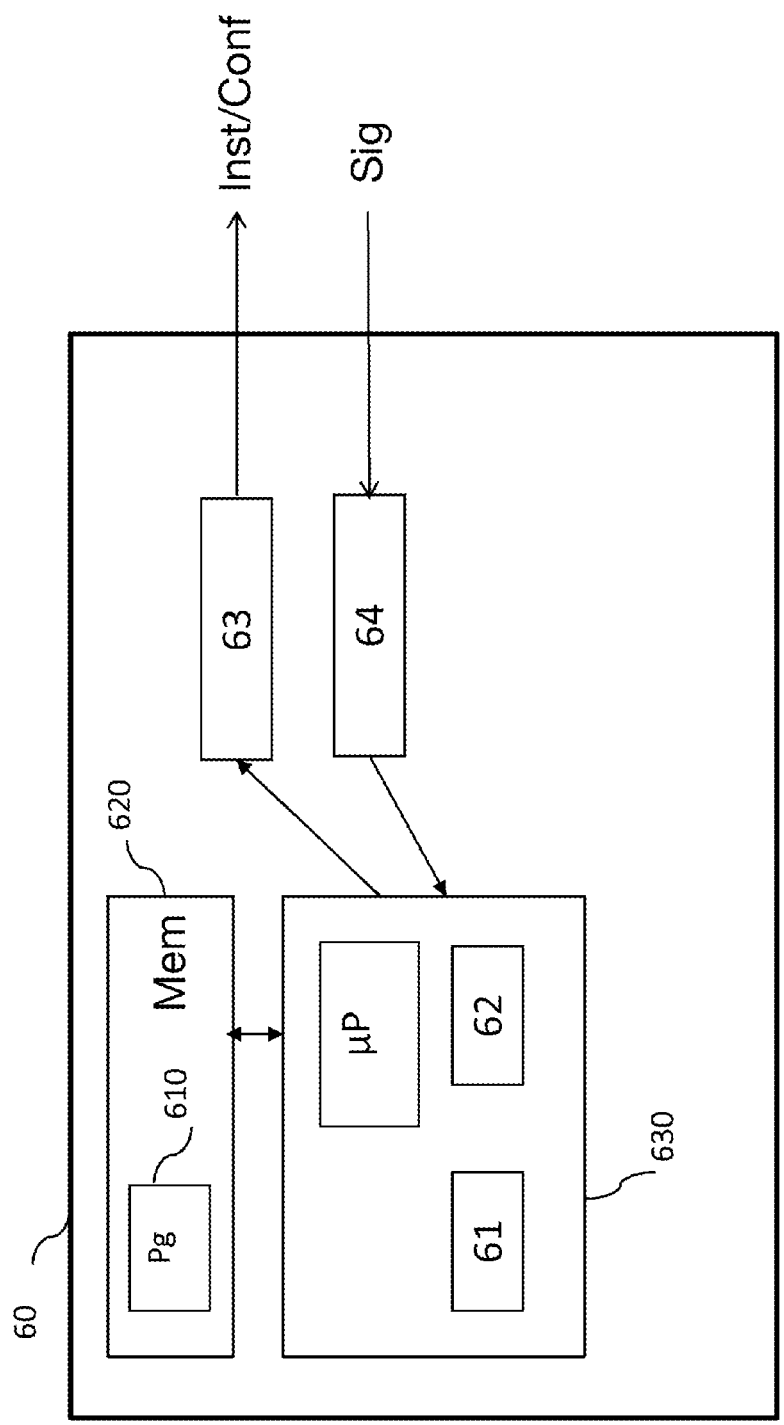
Figure 5:
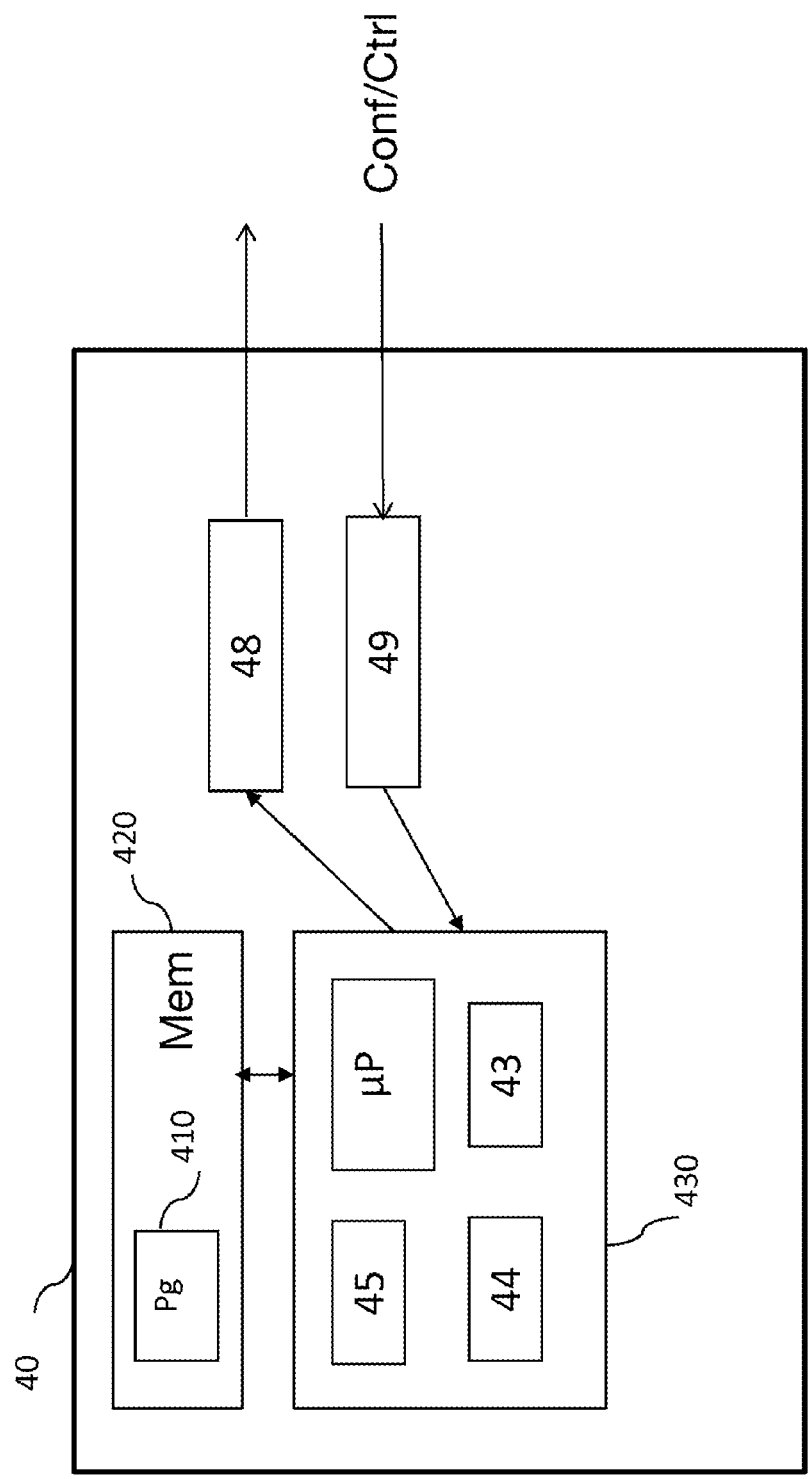

Other advantages and characteristics of the invention will be more clearly apparent on reading the following description of particular embodiments of the invention which are given by way of simple illustrative and nonlimiting examples, and of the appended drawings, among which:

FIG. 1 presents in a schematic manner according to the prior art an infrastructure of a control plane of a communications network, FIG. 2 presents an exemplary infrastructure of a control plane of a communications network implementing the management method and the steering method, according to one embodiment of the invention, FIG. 3 presents an exemplary implementation of the various steps of the method for managing a classification rule and of the steering method, according to one embodiment of the invention, FIG. 4 presents an exemplary structure of a device for managing a classification rule, according to one embodiment of the invention, FIG. 5 presents an exemplary structure of a device for steering a packet of a control message, according to one embodiment of the invention.

5. DETAILED DESCRIPTION OF AT LEAST ONE EMBODIMENT OF THE INVENTION

In the subsequent description, examples are presented of several embodiments of the invention based on a control plane of an IMS infrastructure, but the invention also applies to other types of communications infrastructures in which control messages are transmitted between entities, allowing in particular the establishment of a communication between one or more client terminals and one or more remote entities. It should be noted that the client terminals and the remote entities may be managed by one and the same communications infrastructure or by distinct communications infrastructures. When a terminal or an entity is managed by an infrastructure, this signifies that the terminal or the entity is registered with an entity belonging to this infrastructure. A communications infrastructure can also ensure the forwarding of control messages of entities that it does not manage. In this case, the communications infrastructure is considered to be a transit infrastructure for these control messages.

Reference is firstly made to FIG. 1 which presents in a schematic manner, according to the prior art, an infrastructure 5 of a control plane of a communications network. This control plane is composed of entities among which may be distinguished the control entities, in charge of establishing the communications, also called call servers, and the application servers which execute additional services upon the establishment of a call. In FIG. 1, the control entities are the entities 40, 50, 60, 20 while the application servers are the servers 100, 110, 120, 130, 140. The control messages necessary in particular for the establishment of communications travel through a series of entities and of servers each performing certain tasks until they reach the terminal device 3, or a server relating to this terminal 3, with which a device 1 wishes to initiate a communication. In the case of an inter-domain communication, that is to say between two distinct communications infrastructures, it is probable that a control message is sent by the S-CSCF entity 60 to an entity of IBCF type 20. The control messages may be for example invitation messages (SIP invite in the IMS networks), acknowledgment messages, disconnection messages, messages making it possible to indicate communication parameters. The terminal 1, connected to an access equipment 10, transmits a control message to a default entity, the P-CSCF 40, which transmits the message to the S-CSCF entity 60. On the basis of the parameters of the control message, and by virtue of information items provided by the HSS server 50 when sending a signaling message, for example a registration message, from the terminal 1 to the S-CSCF entity 60, the S-CSCF 60 determines the application servers to be invoked. If several application servers from among 100, 110, 120, 130, 140 must be invoked, the control message must always be redirected to the S-CSCF entity 60 between two invokings of application servers. A control message sent by the terminal 1, if it must be processed by the servers 100, 110, 140, will follow the following path: the terminal 1 transmits the message to the access equipment 10, which sends it to the P-CSCF entity 40, which transmits it to the S-CSCF entity 60, which sends it to the server 100, which retransmits it to the S-CSCF entity 60, which sends it to the server 110, which retransmits it to the S-CSCF entity 60, which sends it to the server 130 which retransmits it to the S-CSCF entity 60, which transmits it to the IBCF entity 20 if dealing with a control message relating to an inter-domain communication with a terminal 3 belonging to the domain 30. According to the prior art, the S-CSCF entity 60 represents a nerve point of the architecture since it ensures the routing of the control messages between the application servers of the communications infrastructure 5 but also to access the infrastructure of the domain 30.

Reference is thereafter made to FIG. 2 which presents an exemplary infrastructure of a control plane of a communications network implementing the management method and the steering method, according to one embodiment of the invention. The entities present in this FIG. 2 are the same as those described in FIG. 1. Certain entities of the infrastructure furthermore integrate capabilities making it possible to implement the method of management of a classification rule according to one embodiment and certain entities of the infrastructure 5 implement the steering method according to one embodiment. The terminals 1 and 2 register with the infrastructure 5 while the terminal 3 registers with another infrastructure 30. The terminals 1, 2 on the one hand and 3 on the other hand are therefore not managed by the same infrastructure. In this embodiment, it is considered that the P-CSCF entity 40 implements a steering method for the packets of the outgoing control messages, emitted by the terminal 1 destined for the terminal 3. The IBCF entity 20 implements the steering method according to one embodiment of the invention for the packets of the incoming control messages, emitted by the terminal 3 destined for the terminal 2. In another embodiment, the method for steering the packets of the incoming control messages is implemented in the S-CSCF entity 60.

According to one embodiment of the invention, the S-CSCF entity 60 has determined, during the registration of the terminal 1, by virtue of the sending of a specific signaling message (registration), a rule for classifying the packets of a control message emitted by the terminal 1. The S-CSCF entity 60 has transmitted this rule to the terminal 1 in an instruction message, which can be a registration response message, as well as to the steering entities 40 and 20 by virtue of the sending of a configuration message. The S-CSCF entity 60 has the possibility of establishing as many classification rules as necessary for the steering of the control messages. The application servers 100, 110, 120, 130, 140 ensure specific application-related functions such as functions for number translation, for service continuity VCC (in English Voice Call Continuity) . . . .

The S-CSCF 60, in charge of determining the classification rules, constructs for example three classification rules for the packets of the outgoing control messages and two rules for the packets of the incoming control messages. On receipt of packets of a control message corresponding to a rule, the steering entities 20, 40 arrange for the packets of the message to be routed gradually through the entities and servers of the path selected as a function of the rule. Hereinafter in the document, an entity signifies interchangeably the call servers and the application servers. In the case where network function chaining techniques are implemented, the steering device can configure a field of the packets or else add a header to the packet, such as a header NSH (in English Network Service Header) specified to the IETF in the document draft-ietf-sfc-nsh (version 10, September 2016). Thus, each entity and server on the path supporting the NSH specifications within the infrastructure, is able to transmit the packet to the following entity in the chain by interpreting the added header. In the embodiment described hereinbelow, a header is added to the packets of the control messages.

Classification rule R1 is selected if a packet of an outgoing control message satisfies two conditions a and b.

Classification rule R2 is selected if a packet of an outgoing control message satisfies a condition a.

Classification rule R3 is selected if a packet of an outgoing control message satisfies a condition b.

Classification rule R4 is selected if a packet of an incoming control message satisfies a condition c.

Classification rule R5 is selected if a packet of an incoming control message satisfies a condition d.

Conditions a, b, c, d, e are also called service information items. These information items can comprise "filtering parameters" which may be of various types. A condition can correspond to a value of the field of a packet of a control message. For example, the value of the field P-asserted-Identity and/or of the field Remote-party-Identity will be able to be used to determine a classification rule.

To the classification rule R1, corresponds a packet header H1,

To the classification rule R2, corresponds a packet header H2,

To the classification rule R3, corresponds a packet header H3,

To the classification rule R4, corresponds a packet header H4,

To the classification rule R5, corresponds a packet header H5.

To the packet header H1, corresponds the path passing through the P-CSCF entity 40, the server 100, the server 110, the server 120, the IBCF entity 20. This path 75 is represented in FIG. 2.

To the packet header H2, corresponds the path passing through the P-CSCF entity 40, the server 120, the IBCF entity 20. For the sake of clarity, this path is not represented in FIG. 2.

To the packet header H3, corresponds the path passing through the P-CSCF entity 40, the IBCF entity 20. For the sake of clarity, this path is not represented in FIG. 2.

To the packet header H4, corresponds the path passing through the IBCF entity 20, the server 130, the P-CSCF entity 40. For the sake of clarity, this path is not represented in FIG. 2.

To the packet header H5, corresponds the path passing through the IBCF entity 20, the server 140, the server 130, the P-CSCF entity 40. This path 85 is represented in FIG. 2.

In another embodiment, the terminal 1 has the capability to configure the field of a packet or to add a header to a packet corresponding to the classification rule received in an instruction message, thereby affording the advantage of being able to determine a path from the terminal 1. This embodiment affords the possibility, if necessary, of choosing an access equipment and/or a P-CSCF entity differing according to the configured field or the added header.

In another embodiment, the conditions obtained for the terminal 1 from among the conditions a, b, c, d, e can be transmitted by an HSS server 50 to the S-CSCF entity 60. The S-CSCF entity 60 then determines a rule from among the rules R1, R2, R3, R4, R5 on the basis of the conditions obtained from the HSS for the terminal 1. In another embodiment, the HSS server 50 itself determines, for the terminal 1, the rule from among the rules R1, R2, R3, R4, R5 that it then transmits to the S-CSCF entity 60.

In one embodiment, the S-CSCF entity 60 can transmit the whole set of classification rules to the steering devices 20 and 40. The devices 20 and 40 select the rule for the packets of a control message received as a function of the information items present in the rules received. The steps of configuring a field of the packet or of the adding of a header remain identical.

Reference is thereafter made to FIG. 3 which presents an exemplary implementation of the various steps of the process for managing a classification rule, according to one embodiment of the invention.

The entities 1, 40, 50, 60 and 20 of FIG. 3 are respectively a terminal, a P-CSCF entity implementing the steering method, an HSS server, an S-CSCF entity implementing the method for managing a classification rule and an IBCF entity implementing the steering method. The entities 70 and 80 are respectively an administration entity of the communications infrastructure and a control entity of an SDN infrastructure. These entities are deployed within a communications infrastructure 5. In this embodiment, it is considered that the packets are forwarded by the routers of the infrastructure, which are not represented in the figure, so that the entities (P-CSCF, S-CSCF, I-CSCF, IBCF . . . ) and the application servers execute services such as steering services, application-related processings and advanced service functions in particular. For clarity purposes, there are no application servers represented in this figure. The routing parameter is however exploited by routers of the infrastructure to forward the packets of the control messages, for example according to the SDN technologies, to the entities and the application servers. In another embodiment, the entities and the application servers can themselves route the packets by using the routing parameter inserted by the steering device.

During a step E1, the administration entity 70 sends a message M1 comprising the data of the profiles of the users of the infrastructure to the HSS server 50. These data will thereafter be used to determine the classification rules. These data comprise identities of the users as well as information items regarding the users' subscription to services.

During a step E2, the administration entity 70 transmits a configuration message M2 to the SDN control entity 80. This configuration message comprises forwarding rules which thereafter allow each entity of the infrastructure, once they have received these information items from the SDN control entity 80, to know the entity or the server to which a packet must be transmitted. This forwarding is carried out by relying on a routing parameter configured by a steering device of the infrastructure. SDN technologies are used in this embodiment but it is possible to envisage other configuration techniques. The configuration messages sent by the SDN control entity 80 to the entities in charge of forwarding the packets are not represented in FIG. 3.

During a step E21, the management entity 70 sends a message M21 comprising management information items to the S-CSCF entity 60. These management information items, sent by the management entity 70, correspond for example to information items for the management of packets of control messages in transit in the infrastructure. In this case, the entities at the origin and destination of the control messages are not registered with the communications infrastructure implementing the management method at the moment at which the management information items are transmitted by the entity 70. It is also possible for the management entity to transmit these management information items at any moment, in particular to intervene on the classification rules determined and the steering of the control message packets. This message is optional. Indeed, in an embodiment, the management entity does not transmit management information items and the classification rules are determined without information items originating from the management entity 70.

During a step E3, the terminal 1 registers with the S-CSCF entity 60 by sending a message M3. This message M3 corresponds, in an IMS infrastructure, to a message of SIP REGISTER type. This signaling message is then a registration message.

During a step E4, the S-CSCF 60 transmits a message M4 to the HSS server 50 corresponding to a request for information making it possible to determine a classification rule for the terminal 1. The S-CSCF entity 60 must insert into the message M4 an information item on the identifier of the terminal 1 received in the message M3. A message based on the Diameter protocol (IETF RFC https://tools.ietf.org/html/rfc6733) can be transmitted. In particular, a message of SAR type (in English Server Assignment Request) can advantageously be used during this step E4. It should be noted that the S-CSCF 60 can exchange several messages with the HSS in particular for the authentication of the terminal 1. In particular, step E4 proceeds once the authentication, not represented in the figure, of the terminal 1 has been executed.

During a step E5, the HSS server 50 transmits a message M5 to the S-CSCF entity 60 in response to the message M4 received. This message M5 comprises service information items relating to the packets of the control messages. In another embodiment, the service information items correspond to classification rules and the HSS server 50 therefore transmits classification rules to the S-CSCF entity 60. The message M5 will be able to correspond to a message of type SAA (in English Server Assignment Answer) modified if necessary to integrate, according to the embodiment adopted, classification rules.

During a step E51, the S-CSCF entity 60 determines a classification rule as a function of the service information items obtained in step E5 and of the management information items possibly obtained during step E21. According to the embodiments, this may entail storing the classification rules received or else formulating classification rules as a function of rules, such as iFC rules, received from the HSS server 50 and management information items received from the management entity 70. In another embodiment, the S-SCSF server 60 furthermore uses the information items of the packets of the control messages to determine the classification rules.

During a step E6, the S-CSCF entity 60 sends an instruction message M6, in response to the registration request, to the terminal 1. This message M6 comprises a classification rule determined by the S-CSCF entity 60. In one embodiment, the terminal 1 uses the classification rule received to mark the packets of the signaling messages emitted so that they integrate a routing parameter (a configuration of a field of the packets or the addition of a header to the packets) making it possible to forward the packets according to a path determined on the basis of the integrated parameter. The entities of the infrastructure on the path determined on the basis of the packet's routing parameter and of the configuration messages sent by the SDN control entity 80 (which are not illustrated), are able to forward the packets of the control messages within the infrastructure. In this embodiment, the terminal 1 implements the method for steering the packets. In another embodiment, in particular if the terminal 1 is not able to implement the steering method, the terminal ignores the classification rule received.

The message M6 sent can correspond to a message of SIP REGISTER 200 OK type modified to comprise a classification rule.

During a step E7, the S-CSCF entity 60 sends the P-CSCF entity 40 a configuration message M7 comprising the classification rule that it has determined. The message M7 is a configuration message on the basis of which the P-CSCF entity 40 implements a steering method consisting in updating a field of the packets of a control message or in adding a header to these packets, for example a header of NSH type. The P-CSCF 40 ensures the steering function if the terminal 1 has not inserted a routing parameter into the packet emitted, consisting for example in inserting a header. The P-CSCF 40 can also ensure the steering function in the case where it wishes to ensure this function and does not trust the routing parameter inserted by the terminal 1, in the case where the terminal 1 implements the steering method. The entity ensuring the management of the communications infrastructure may indeed decide to have the steering method be supported by entities whose administration it ensures and on which it is possible for it to intervene. In this case, the P-CSCF 40 deletes the routing parameter inserted by the terminal 1 and inserts its own routing parameter.

The message M7, in another embodiment, is not a specific message. The message M6 sent to the terminal 1 by the S-CSCF entity 60 is intercepted by the P-CSCF entity 40. The P-CSCF entity 40 then utilizes the classification rule present in the message M6 before returning it to the terminal. A single message M6 is then transmitted by the S-CSCF entity 60 destined for the terminal 1. This message is intercepted, and then retransmitted to the terminal 1, by the P-CSCF entity 40.

During a step E71, the P-CSCF entity 40 executes several tasks enabling the control messages to be made to follow a path in the communications infrastructure. On the basis of the classification rule obtained during step E7, the P-CSCF entity 40 determines a routing parameter which may correspond for example to a value of a header which is added to the packets of the control messages or else to the configuration of a field of the packets. The P-CSCF entity 40 thereafter transmits the packets of the control messages to an entity of the communications infrastructure. To achieve this, the P-CSCF 40 can use the routing parameter that it has determined and inserted with the packet as well as configuration information items received for example from the SDN controller 80 if dealing with an SDN architecture. Any other type of configuration enabling it to associate the routing parameter inserted with an entity to which to transmit the packets of the control messages can be used. The transmission of the control messages within the infrastructure is not represented in FIG. 3.

During a step E8, the S-CSCF entity 60 transmits a configuration message M8 to the IBCF entity 20, the message comprising a classification rule. This message enables the IBCF entity 20 to forward the packets of the incoming control messages. This message, in an embodiment where the S-CSCF entity 60 implements a method for steering the packets of the incoming control messages, is optional. In this embodiment, the IBCF entity 20 then transmits all the packets of the incoming control messages to the S-CSCF entity 60 which implements the steering method. The packets of the incoming control messages originate from a communication infrastructure distinct from the infrastructure 5 and are destined for entities of the infrastructure 5 or for entities belonging to yet another entity, different from the emitting entity, the infrastructure 5 then ensuring a transit function for these packets of the control messages.

During step E81, the IBCF entity 20 executes tasks similar to those executed by the P-CSCF entity 40 during step E71. The IBCF entity 20 executes these tasks for the incoming packets while the P-CSCF entity executes the tasks for the outgoing packets. In the case where the S-CSCF entity 60 implements the steering method, it also executes the tasks relating to step E81.

The control infrastructure's entities implemented in FIG. 3 can be deployed in the form of hardware devices or else in the form of virtualized instances, several virtualized instances being able to be instantiated in one and the same physical device. The term "entity" used in the figures can therefore be replaced with "virtualized instance" in the case where the control infrastructure is deployed in a virtualized form, or else "device" if dealing with physical equipment. It should furthermore be noted that the entities represented in FIG. 3 may be more diverse. In particular in certain communications infrastructures, entities in charge in particular of filtering or security of functions can be implemented in a communications infrastructure 5. Thus functions related to the legal interceptions or to the filtering of certain parameters must sometimes be instantiated via the deployment of specific entities between the entities P-CSCF 40 and S-CSCF 60 on the one hand and IBCF 20 and S-CSCF 60 on the other hand. These entities then intervene in the establishment of the communications service and form part of the path followed by the packets of the control messages, in the same way as the entities represented in FIG. 3.

In conjunction with FIG. 4, an exemplary structure of a device for managing a classification rule is now presented, according to one embodiment of the invention.

The device 60 for managing a classification rule implements the method for managing a classification rule, of which various embodiments have just been described.

For example, the device 60 comprises a processing unit 630, equipped for example with a microprocessor μP, and driven by a computer program 610, stored in a memory 620 and implementing the management method according to the invention. On initialization, the code instructions of the computer program 610 are for example loaded into a RAM memory, before being executed by the processor of the processing unit 630.

Such a device 60 comprises:
a receiver 64, able to receive a signaling message (Sig) of a terminal comprising data for identifying a user
an emitter 63, able to emit
   an instruction message (Inst) comprising said determined classification rule destined for said terminal,
   a configuration message (Conf) comprising said classification rule destined for at least one device for steering the at least one packet,
an obtaining module 61 designed to obtain at least one information item relating to the communication service, termed service information item,
a determination module 62 designed to determine said rule for classifying said packet as a function of the service information item obtained, the rule being used for the steering of said packet in the communications infrastructure.

The modules described in conjunction with FIG. 4 can be hardware modules or software modules.

In conjunction with FIG. 5, an exemplary structure of a device for steering a packet of a control message is now presented, according to one embodiment of the invention.

The device 40 for steering a packet of a control message implements the method for steering a packet of a control message, of which various embodiments have just been described.

For example, the device 40 comprises a processing unit 430, equipped for example with a microprocessor μP, and driven by a computer program 410, stored in a memory 420 and implementing the method of steering according to the invention. On initialization, the code instructions of the computer program 410 are for example loaded into a RAM memory, before being executed by the processor of the processing unit 430.

Such a device 40 comprises:
a receiver 49, able to receive:
   a configuration message (Conf) comprising a classification rule,
   a packet of a control message (Ctrl),
a determination module 43 designed to determine a routing parameter as a function of the classification rule contained in the configuration message received,
an insertion module 44 designed to insert the routing parameter determined into a field of said packet,
a selection module 45 designed to select an entity to which to emit said packet, as a function of the routing parameter inserted,
an emitter 48, able to emit said packet destined for the selected entity.

The modules described in conjunction with FIG. 5 can be hardware modules or software modules. The steering device 40 which has just been described is able to forward the outgoing signaling packets, according to FIG. 2. The steering device 20, able to steer the packets of the incoming signaling messages, exhibits the same structure as the device 40.

The exemplary embodiments of the invention which have just been presented are only some of the conceivable embodiments. They show that the invention makes it possible to use techniques related to the chaining of functions, in particular specified to the IETF in the document RFC 7665 in a control plane for the forwarding requirement in respect of control messages. The requirements in terms of function chaining techniques and the implementation of these techniques in a control plane of a communications infrastructure are described in this document. In such an infrastructure, the terminals must register in order to be able to be contacted but also to initiate communications. The invention consists, in one embodiment, in profiting from the phase of registering of a terminal to associate therewith a classification rule, on the basis of which it is thereafter possible to steer the control messages between the entities of the infrastructure, including the call servers and the application servers, of the infrastructure.

In another embodiment, the signaling message received by the management device is not a message of registration of a terminal but corresponds to a control message, which is forwarded in accordance with a classification rule determined on the basis of a service information item. The service information item may for example originate from an HSS server. In this embodiment, the management device, on receipt of a control message, determines a classification rule and transmits this rule to a steering device. In yet another embodiment, the management device comprises a steering device and implements the steps of the management and steering methods. In this embodiment, on receipt of packets of a control message, the management device forwards them over a path fixed as a function of the classification rule determined.

The solutions offered in the prior art usually rest upon a star-like infrastructure where a device, in this instance the S-CSCF for an IMS infrastructure, ensures the forwarding of the control messages between the entities. This is carried out if required by traveling through the S-CSCF device several times, leading to non-optimal routing and to consumption of the resources, comprising the interconnection links and the capabilities of the S-CSCF device, drawbacks which are eliminated by the invention.

The invention claimed is:

1. A management method for managing a rule for classifying a packet of a control message relating to a communications service to be used by a terminal of a user, said rule relating to routing of said packet in a communications infrastructure configured to route packets and providing said service, the method being implemented in a control entity of said infrastructure and comprising:
   after receiving a signaling message of said terminal, comprising data for identifying said user:
   obtaining an information item relating to the communication service, termed service information item,
   determining said rule for classifying the at least one packet as a function of the service information item obtained, the rule being used for steering said packet in the communications infrastructure,
   emitting an instruction message comprising said determined classification rule destned for said terminal,
   emitting a configuration message comprising said classification rule destned for at least one access device of the communications infrastructure acting as a steering device.

2. The management method as claimed in claim 1, where the service information item comprises a filtering parameter relating to said identification data received and is obtained from a server comprising data relating to users.

3. The management method, as claimed in claim 1, where the service information item comprises a management information item emitted by a management entity of the communications infrastructure.

4. The management method, as claimed in claim 1, where the signaling message is a message of registration of said terminal with the communications infrastructure.

5. The management method, as claimed in claim 1, where the instruction message and the configuration message are included in one and the same message.

6. The management method, as claimed in claim 1, where the service information item is based on the content of at least one field of the packet of the control message.

7. The management method, as claimed in claim 1, where the control entity is implemented in a management entity relating to a user.

8. A steering method for steering a packet of a control message relating to a communications service to be used by a terminal of a user, the steering being carried out in a communications infrastructure configured to route packets and providing said service, the method being implemented by an access device of the communications infrastructure acting as a steering device and comprising:
   receiving the packet of the control message,
   receiving a configuration message comprising a classification rule emitted by a control entity,
   determining a routing parameter as a function of the rule contained in the configuration message received, the rule being used for the steering of said packet in the communications infrastructure,
   inserting the routing parameter determined into a field of said packet,
   selecting an entity to which to emit the packet as a function of the routing parameter, and
   emitting said packet destned for the selected entity.

9. The steering method as claimed in claim 8, where the routing parameter is inserted into a NSH field (Network Service Header) of the header of the packet.

10. A device for managing a rule for classifying a packet of a control message relating to a communications service to be used by a terminal of a user, said rule relating to the routing of said packet in a communications infrastructure configured to route packets and providing said service, wherein the device comprises:
    a receiver designed to receive a signaling message of said terminal, comprising data for identifying said user;
    an obtaining module configured to obtain an information item relating to the communication service, termed service information item,
    a determination module configured to determine said rule for classifying said packet as a function of the service information item obtained, the rule being used for the steering of said packet in the communications infrastructure,
    an emitter configured to emit:
      an instruction message comprising said determined classification rule destned for said terminal,
      a configuration message comprising said classification rule destned for at least one access device of the communications infrastructure acting as a steering device.

11. A steering device for steering a packet of a control message relating to a communications service to be used by a terminal of a user, implemented in a communications infrastructure configured to route packets and providing said service, steering device being implemented in an access device of the communications infrastructure and comprising:
    a receiver;
    an emitter;
    a processor; and
    a non-transitory computer-readable medium comprising instructions stored thereon which when executed by the processor configure the processor to:
      receive with the receiver:
        the packet of the control message, and
        a configuration message comprising a classification rule,
      determine a routing parameter as a function of the rule contained in the configuration message received,
      insert the routing parameter determined into a field of said packet,
      select an entity to which to emit said packet as a function of the routing parameter inserted, and
      emit with the emitter said packet destned for the selected entity.

12. A non-transitory computer-readable recording medium comprising instructions stored thereon which when executed by a processor of a managing device configure the managing device to: manage a rule for classifying a packet of a control message relating to a communications service to be used by a terminal of a user, said rule relating to routing of said packet in a communications infrastructure configured to route packets and providing said service, the managing comprising:

after receiving a signaling message of said terminal, comprising data for identifying said user:
obtaining an information item relating to the communication service, termed service information item,
determining said rule for classifying the at least one packet as a function of the service information item obtained, the rule being used for the steering of said packet in the communications infrastructure,
emitting an instruction message comprising said determined classification rule destined for said terminal, and
emitting a configuration message comprising said classification rule destined for at least one access device of the communications infrastructure acting as a steering device.

* * * * *